(12) United States Patent
Lothian et al.

(10) Patent No.: US 9,942,575 B1
(45) Date of Patent: Apr. 10, 2018

(54) ASSIGNING VIDEOS TO SINGLE-STREAM AND MULTI-STREAM DECODERS

(71) Applicant: Google Inc., Mountain View, CA (US)

(72) Inventors: Ryan James Lothian, London (GB); Liam Thomas Barden, London (GB)

(73) Assignee: GOOGLE LLC, Mountain View, CA (US)

( * ) Notice: Subject to any disclaimer, the term of this patent is extended or adjusted under 35 U.S.C. 154(b) by 706 days.

(21) Appl. No.: 14/541,013

(22) Filed: Nov. 13, 2014

(51) Int. Cl.
*H04N 7/12* (2006.01)
*H04N 19/88* (2014.01)
*G06F 9/38* (2018.01)
*H04N 19/436* (2014.01)

(52) U.S. Cl.
CPC .......... *H04N 19/88* (2014.11); *G06F 9/3822* (2013.01); *H04N 19/436* (2014.11)

(58) Field of Classification Search
CPC ..... H04N 19/436; H04N 19/88; G06F 9/3822
USPC .......................................... 375/240.25, 240.1
See application file for complete search history.

(56) References Cited

U.S. PATENT DOCUMENTS

| | | | |
|---|---|---|---|
| 5,623,308 A | 4/1997 | Civanlar et al. | |
| 8,204,131 B2 | 6/2012 | Zador et al. | |
| 8,380,053 B2 | 2/2013 | Tran et al. | |
| 8,514,949 B1 | 8/2013 | Keller et al. | |
| 2007/0133692 A1 | 6/2007 | Reddy et al. | |
| 2009/0196356 A1 | 8/2009 | Houki | |
| 2010/0040151 A1 | 2/2010 | Garrett | |
| 2010/0166081 A1 | 7/2010 | Onoye et al. | |
| 2012/0023256 A1* | 1/2012 | Chen ...................... | H04L 47/10 709/231 |
| 2014/0108605 A1 | 4/2014 | Wang et al. | |

OTHER PUBLICATIONS

Cardinal Intellectual Property Patent Search Report for "System for assigning video sources to multi-stream and single-stream decoders" Aug. 2014. 10 pages.

* cited by examiner

*Primary Examiner* — Farzana Hossain
(74) *Attorney, Agent, or Firm* — Lowenstein Sandler LLP

(57) ABSTRACT

A method for assigning videos to multi-stream and single-stream decoders is disclosed. The method determines a ranking of each of a plurality of videos. The method further identifies a type of each video for at least part of the plurality of videos. The method also determines a configuration of a plurality of hardware decoders to decode a subset of the plurality of videos for simultaneous presentation on a screen of a user device. The configuration may define a mode of each of the plurality of decoders. The method further assigns the subset of videos to the plurality of hardware decoders for decoding according to the configuration.

20 Claims, 7 Drawing Sheets

ASSIGNING VIDEOS TO SINGLE-STREAM AND MULTI-STREAM DECODERS

TECHNICAL FIELD

This disclosure relates to the field of content delivery platforms and, in particular, to assigning videos to decoders.

BACKGROUND

On the Internet, content delivery platforms or other applications allow users to upload, download, and share digital content such as videos. Videos may include movie clips, TV clips, and music videos, as well as amateur content such as video blogging, short original videos, advertisements, other multimedia content, etc. Users may use computing devices such as smart phones, cellular phones, laptop computers, desktop computers, netbooks, tablet computers to upload, download, share, edit, and/or playback videos.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In one implementation, a method for assigning videos to single-stream and multi-stream decoders is disclosed. The method determines a ranking for each of a plurality of videos. The method further identifies a type of each video for at least a part of the plurality of videos. A type may be multi-stream compatible or single-stream compatible. The method also determines, based on rankings and types of the plurality of videos, a configuration of a plurality of hardware decoders to decode a subset of the plurality of videos for simultaneous presentation on a screen of a user device. The configuration may define a mode of each of the plurality of decoders, such as single-stream mode or multi-stream mode. The method further assigns the subset of videos to the plurality of hardware decoders for decoding according to the configuration.

In one implementation, the method identifies new rankings for the plurality of videos. The method further modifies the configuration of the plurality of hardware decoders based on the new rankings.

In one implementation, the method determines the ranking for each of the plurality of videos by determining a location for each of the plurality of videos on the screen of the user device. The method further compares the determined location to a current interest point on the screen. The method ranks each of the plurality of videos based on the comparison of the determined location to the current interest point.

In one implementation, the current interest point may be determined based on one of a predetermined positon on the screen or a user input. The user input may be provided via one of a user touch on the screen, a cursor positioning on the screen, or a gaze point of a user on the screen.

In one implementation, the method modifies the configuration of the plurality of hardware decoders by determining different configurations able to decode the subset of the plurality of videos. The method further estimates penalties for the different configurations and video assignments. The method selects the configuration with a least penalty.

In one implementation, the method estimates penalties for the different configurations and video assignments by determining, for each configuration of the different configurations, a number of moves for videos from the subset of the plurality of videos from a previous video assignment to a new video assignment. Each move may incur a delay penalty.

In one implementation, the different configurations able to decode the subset of the plurality of videos include a first number of hardware decoders in a first mode required to decode at least a part of the subset of the plurality of videos and a second number of hardware decoders in a second mode required to decode at least another part of the subset of the plurality of videos.

In one implementation, the mode of each of the plurality of hardware decoders is one of a single-stream mode or a multi-stream mode.

In one implementation, the user device is a mobile device.

In one implementation, the subset of the plurality of videos is simultaneously presented at a frame rate that provides a visually imperceptible pause between successive visually distinct frames.

In another implementation, the plurality of videos is a plurality of video previews.

In additional implementations, computing devices for performing the operations of the above described implementations are also disclosed. Additionally, in implementations of the disclosure, a computer readable storage media stores methods for performing the operations of the above described implementations.

BRIEF DESCRIPTION OF THE DRAWINGS

The present disclosure is illustrated by way of example, and not by way of limitation, in the figures of the accompanying drawings.

DETAILED DESCRIPTION

Figure 1:
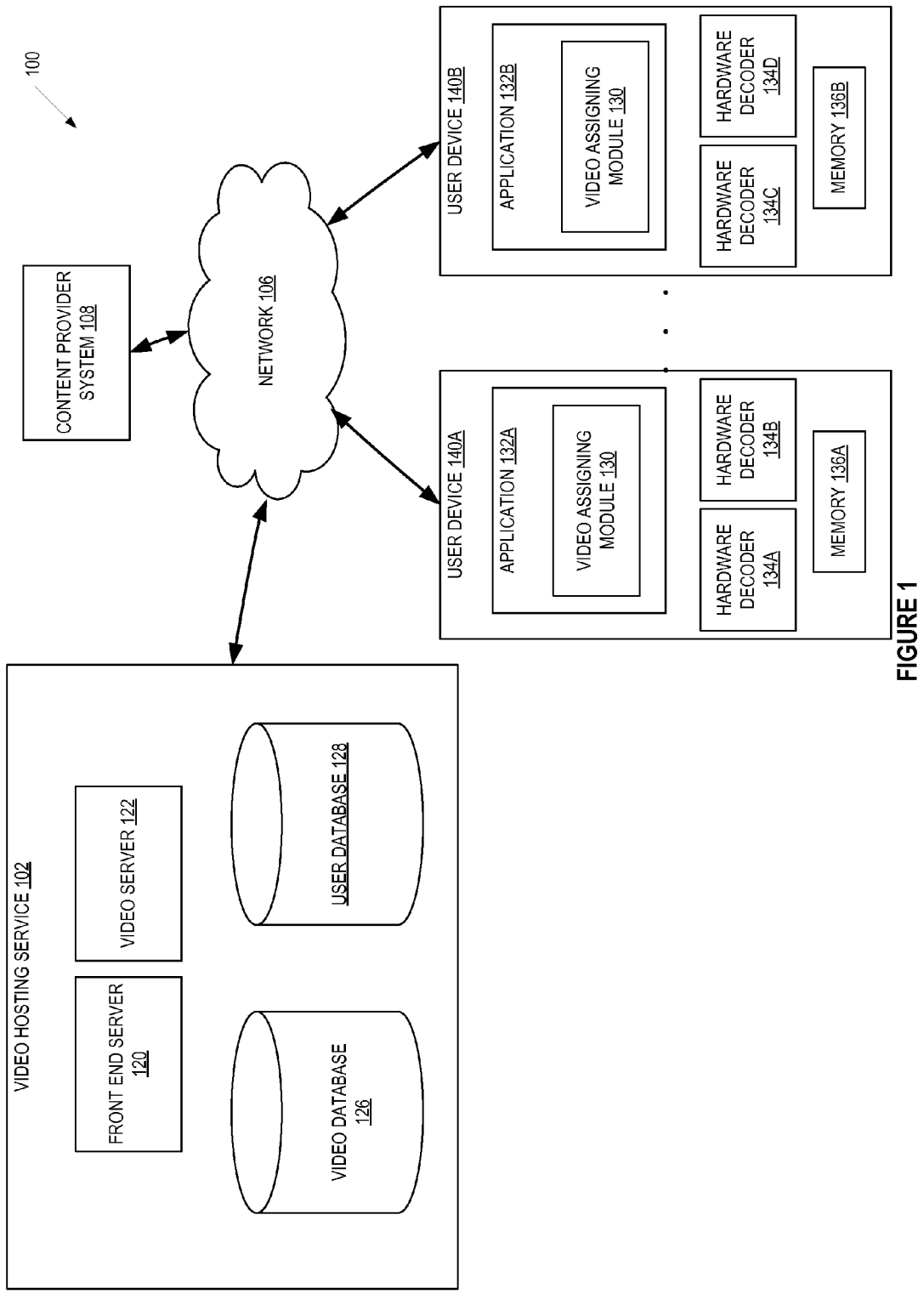
FIG. 1 is a block diagram illustrating an exemplary network system, in which aspects of the present disclosure may be implemented.

The following disclosure sets forth numerous specific details such as examples of specific systems, components, methods, and so forth, in order to provide a good understanding of several implementations of the present disclosure. It will be apparent to one skilled in the art, however, that at least some implementations of the present disclosure may be practiced without these specific details. In other instances, well-known components or methods are not described in detail or are presented in simple block diagram format in order to avoid unnecessarily obscuring the present disclosure. Thus, the specific details set forth are merely examples. Particular implementations may vary from these example details and still be contemplated to be within the scope of the present disclosure.

Implementations of the disclosure pertain to assigning videos to multi-stream and single-stream decoders. As the volume of media content increases, in particular videos, the presentation of videos on user devices becomes increasingly important. User interfaces for browsing or searching videos often display multiple videos in the form of single frame thumbnails or low frame rate low quality animated graphics interchange format (GIF) images. In providing a better user experience, it may be desirable to simultaneously present multiple full frame rate videos, in particular video previews, on the screen of a user device. Video previews may be full frame rate (or low frame rate) videos that show a portion of the video. However, presenting multiple videos simultaneously on the screen of a user device may have challenges.

User devices may have hardware and power constraints. Mobile devices in particular may be constrained by limited battery life and limited central processing unit (CPU) resources. Videos may be decoded by software decoders. However, software decoders may consume a large portion of a CPU's resources as well as consume more power (e.g., up to ten times) than hardware decoders. Hardware decoders may consume less power and less CPU resources than software decoders but may be limited in number, limiting the number of videos that may be decoded at the same time. Mobile devices, for example, may only include two hardware decoders. Hardware decoders may be configured to decode a single video into a single bitstream (e.g., single-stream mode providing a single-source bitstream) or multiple videos combined into a single bitstream (e.g., multi-stream mode providing a multi-source bitstream). A multi-source bitstream may be decoded and displayed as multiple videos. However, not all videos are compatible to be combined into a multi-source bitstream.

Aspects of the present disclosure provide a mechanism for efficiently assigning videos, including videos that cannot be combined into a multi-source bitstream, to hardware decoders that may be configured in both a single-stream mode and multi-stream mode so that multiple videos may be presented simultaneously on the screen of a user device. In particular, in one implementation, a user device may display a user interface that presents a plurality of video previews simultaneously on the screen of the user device. Each of the plurality of video previews may be presented as full frame rate videos (e.g., 30 frames per second). Each of the plurality of videos may be presented as low frame rate videos, such as low frame rate video previews. As a user scrolls up or down on the webpage, a new plurality of video previews may be simultaneously presented on the screen of the user device. According to implementations of the present disclosure, video previews can be assigned to hardware decoders configured in single-stream mode or multi-stream mode to maximize that number of video previews that can be simultaneously presented on the screen of the user device without sacrificing the user viewing experience.

FIG. 1 is a block diagram illustrating an exemplary network system in which implementations of the present disclosure may be implemented. The network system 100 may include a video hosting service 102 that is connected to a user device 140A and 140B by a network 106. One or more content provider systems 108 may also be connected to the network 106 for transmitting media content to the video hosting service 102

The network 106 may be any kind of wired and/or wireless computing network or communications means capable of transmitting data or signals, such as a wireless and/or wired computing network allowing communication via, for example, an 802.11 ("Wi-Fi") protocol, cellular data protocol (e.g., EDGE, CDMA, TDMA, GSM, LTE)), and the like. Examples include the internet, which is a packet-switched network, a local area network (LAN), wide area network (WAN), virtual private network (VPN), or any other means of transferring data. A single network or multiple networks that are connected to one another may be used. It is specifically contemplated that multiple networks of varying types may be connected together and utilized to facilitate the communications contemplated by the systems and elements described in this disclosure. Communications via the network 106 may be encrypted or otherwise encoded.

The video hosting service 102 may include a front end server 120, a video server 122, a video database 126, and a user database 128. Other features, such as firewalls, load balancers, application servers, failover servers, site management tools, and so forth may be included, but are not shown so as to more clearly illustrate the features of the network system 100.

The front end server 120 is operable to send information to and receive information from user device 140A and/or 140B via the network 106. The information may include videos, such as digital videos and user interface (UI) documents (e.g., in HTML format defining a web page and I or other format defining a mobile device UI document). The front end server 120 may be configured to define one or more UI documents that provide a graphical user interface for visually browsing and displaying videos as described herein. The front end server 120 may also be configured to receive input, instructions, queries, or other signals from the user device 140A and/or 140B via the network 106, and cause information to be transmitted to the user device 140A and/or 140B in response.

The video server 122 can receive uploaded videos from content providers, such as the content provider system 108, and enable videos to be viewed by the user device 140A and/or user device 140B. Videos may be uploaded to the video server 122, e.g., via the Internet from a personal computer, through a cellular network from a telephone or tablet, mobile device, or by other means for transferring data over the network 106. The uploaded videos may include, for example, video or a combination of video and audio. The uploaded videos are processed and stored in the video database 126. This processing may include format conversion (transcoding or encoding), compression, metadata tagging, and other data processing. Each uploaded video may be assigned a video identifier when it is processed. An identifier may include an identifier, such as a flag, that indicates that a video is of a certain type. A type of video may include a video that is compatible with a multi-stream mode and/or single-stream mode configuration of a hardware decoder. Single-stream mode may be a configuration of a hardware decoder to decode a single video into a single bitstream (e.g., single-source bitstream). Multi-stream mode may be a configuration of a hardware decoder to decode multiple videos combined into a single bitstream (e.g., multi-source bitstream). A single-stream compatible video may be a video that may be decoded by a hardware decoder configured in single-stream mode. A multi-stream compatible video may be a video that may be decoded by a hardware decoder configured in multi-stream mode. Additional details of multi-stream mode and single-stream mode will be described below. In some examples, an uploaded content file may be associated with an uploading user, and a user's account record may be updated in the user database 128 accordingly.

The video database 126 may be used to store the received videos. In one implementation, the video database 126 stores video content and associated metadata, provided by their respective content owners. The video files may have metadata associated with each file such as a video ID, artist, video title, label, genre, time length, and (video) type (single-stream and/or multi-stream), as discussed above.

The user database 128 may identify, for a given user, videos that are associated with the user. Examples include a list of videos uploaded by the user, a list of the user's favorite videos, or one or more playlists that are established by the user. (The term "list", as used herein for concepts such as lists of authorized users, lists of videos, URL lists, and the like, refers broadly to a set of elements, where the elements may or may not be ordered.) In some embodiments, videos may be uploaded and/or viewed anonymously; in which case, the user database 128 may be omitted. Video hosting service 102 may notify users of the types of information that are transmitted to and stored by the video hosting service 102 and provides the user the opportunity to opt-out of having such information collected and/or shared with the video hosting service 102.

The various servers and databases may be implemented, whether as a single piece of software or hardware or as multiple pieces of software or hardware. In general, functions described in one example as being performed on the server side may also be performed on the user side in other examples if appropriate.

The user device 140A and 140B may be implemented in the form of any of a variety of different computing devices. Examples of devices that may be utilized as the user devices 140A and/or 140B include personal computers, digital assistants, personal digital assistants, cellular phones, mobile phones, smart phones, laptop computers and tablet computers. Other devices may be utilized as user device 140A and 140B. In one implementation, user device 140A and 140B may be mobile devices. The user device 140A and 140B may execute an application such as application 132A and 132B, respectively. Using application 132A or 132B, the user may connect to the front end server 120, e.g., of the video hosting service 102 via the network 106.

User device 140A and 140B may include a processing device (not shown). "Physical processing device" or "processing device" herein shall refer to a device capable of executing instructions encoding arithmetic, logical, and/or I/O operations. In one illustrative example, a processor may follow Von Neumann architectural model and may include an arithmetic logic unit (ALU), a control unit, and a plurality of registers. In a further aspect, a processing device may be a single core processor which is typically capable of executing one instruction at a time (or process a single pipeline of instructions), or a multi-core processor which may simultaneously execute multiple instructions. In another aspect, a processing device may be implemented as a single integrated circuit, two or more integrated circuits, or may be a component of a multi-chip module (e.g., in which individual microprocessor dies are included in a single integrated circuit package and hence share a single socket). A processing device may also be referred to as a central processing unit (CPU) or a mobile processing device.

Videos may also be downloaded from the video server 122 to user device 140A or 140B. In one implementation, videos are provided as a file download to the user device 140A and/or 140B. Multiple, for example hundreds of videos may be downloaded to a user device. In an alternative embodiment, videos are streamed to the user device 140A and/or 140B. The means by which video content is received by video server 122 need not match the means by which it is delivered to the user device 140A and/or 140B. For example, a content provider may upload a video via a browser on a personal computer, whereas the user device 104A may view that video as a stream sent to a mobile device. Note also that the video server 122 may itself serve as the content provider.

In one embodiment, a plurality of videos may be downloaded or streamed from video hosting service 102 to user device 140A and/or user device 140B. The plurality of videos may be downloaded or streamed in response to application 132A or 132A requesting video hosting service 102 for the plurality of videos. Videos from video hosting service 102 may be source videos. Source videos (e.g., encoded video or encoded bitstream) may be videos encoded in a particular coding format. For example, a source video may refer to an encoded stream of bits of a digital video, encoded in a particular video coding format. Encoding a video may prepare a video for transmission, storage, and/or encryption. Examples video coding formats may include, but are not limited to, H.262, H263, H.264, H.265, MPEG-1, MPEG-2, MPEG-4, MPEG-H, WMV, VP-6, VP6-E, VP6-S, VP7, VP8, VP9, etc. The source videos may be stored in memory 136A and/or memory 136B.

"Video" herein shall refer to an electronic medium for recording, copying, playback, broadcasting, transmitting and display of moving visual images. Examples of videos may include, but are not limited to, digital videos, movies, video advertisements, video news broadcasts, sports broadcasts, and the like. A video may be consumed via the Internet and/or via a mobile device application. As used herein, video may refer to video content alone or video and audio content combined. For purposes of convenience, video may referred to as "videos", "video files", "source videos", "video content", "bitstream", or "video items", but no limitation on the types of content that may be uploaded are intended by this terminology unless otherwise explicitly expressed. Video may include an electronic file that may be executed or loaded using software, firmware or hardware configured to present the video to an entity. One example of a video may be a video preview. A video preview may be a full frame rate video that shows a portion of the video. A video may be a low resolution video or a high resolution video. A video may include multiple frames.

"Memory" or "memory device" herein shall refer to a volatile or non-volatile memory device, such as RAM, CACHE, ROM, EEPROM, or any other device capable of storing data.

The application 132 and/or 132B may include video assigning module 130. Video assigning module 130 may assign the videos (source videos) received from the video hosting server 102 (e.g., and stored or cached in memory 136A and/or memory 136B) to be decoded by hardware decoder 134A-134D. The video assigning module 130 may assign videos, such as video previews, so that multiple videos may be simultaneously presented on the screen of user device 140A or 140B. Simultaneous presentation on the screen may be the presentation of more than one video on a screen of a user device at the same time. Videos may be simultaneous presented when they are decoded by a hardware decoder at approximately the same time. Video assigning module 130 may be a part of application 132A or 132B, or may be a separate application. Additionally, video assigning module 130 may be a plug-in component that is utilized by the application 132A and/or 132B. Video assigning module 130 will be further described in FIGS. 2-7.

Additionally, application 132A and 132B may include one or more embedded video players (not shown) to present/play the decoded videos on the screen of user device 140A or 140B. The embedded video player may be a native functionality of the application 132A and 132B, or may be a plug-in component that is utilized by the application 132A and 132B. Any player adapted for the video file formats used by the video hosting service 102 may be utilized.

Applications other than the application 132A and 132B may be executed by the user device 140A and 140B and may be utilized to perform the functions that are described herein with reference to application 132A or 132B. While only two user devices and applications are shown, it is understood that very large numbers (e.g., millions) of user devices and applications may be deployed, supported, and in communication with the video hosting service 102 at any time via the network 106. It should be noted that for purposes of illustration, hereinafter user device 140A and its respective features will be described. User device 140B may have the same features and provide the same functionality with respect to user device 140A, unless otherwise noted.

User device 140A may also include a video decoder, such as hardware decoder 134A-B. A video decoder may decode an encoded digital video (e.g., a source video, encoded bitstream, or compressed video) into a decoded digital video for playback and/or editing. A hardware decoder may be a hardware implementation (e.g., hardware device) of a video decoder. A software decoder may be a software implementation of a video decoder. Decoder hereinafter may refer to a hardware decoder unless otherwise noted. In one implementation, video assigning module 130 assigns videos to be decoded by at least one of hardware decoder 134A or 134B. Each of hardware decoder 134A and 134B may have an associated memory, for example a queue that stores at least a part of the source video. A decoder queue may store a limited number of frames, such as ten frames, of a source video. A frame may be a portion of a video such as a single distinct image. When multiple frames are consecutively displayed, the consecutive frames may communicate movement. Full frame rate may be a frame rate that provides a visually imperceptible pause between successive visually distinct frames when displayed on a user device. For example, a full frame rate may display 24 frames per second (fps) or greater. Low frame rate may be a frame rate that provides a visually perceptible pause between successive visually distinct frames. For example, low frame rate may be less than 24 fps. An example of a low frame rate picture may be an animated GIF image. When frames of a source video assigned to the decoder queue are decoded by hardware decoder 134A or 134B, the decoder may output decoded frames and provide the frames to application 132A to be displayed on user device 140A.

When a new video is added to a hardware decoder (e.g., frames of a new source video may be added to the decoder queue) or a video is moved from one hardware decoder to another hardware decoder (e.g., the remaining frames of a source video that were previously decoded by one hardware decoder are assigned to the decoder queue of another hardware decoder), the frames of the video may be placed at the back of the decoder queue. The frames in front of the queue may be decoded first. As such, new or moved videos (e.g., frames) may be decoded later. As a result of being placed at the back of the decoder queue, the decoding of the new or moved videos may be delayed by some time period. For example, the decoding of the new or moved videos may be delayed by one-third of a second. A penalty, such as a delay penalty, may be a time delay of decoding a video at a hardware decoder. The time delay may be caused by moving a video from one hardware decoder to another or adding a new video to a queue of a hardware decoder.

In one implementation, hardware decoders 134A and 134B may be configured in a single-stream mode or a multi-stream mode. In single-stream mode a single video (e.g., source video or single-source bitstream) may be assigned to a hardware decoder to be decoded. A video from memory 136A may be placed in a decoder queue (i.e., frames of a video) of a hardware decoder without any additional modification to the video. As discussed above, a single-stream compatible video may contain or be associated with a video identifier, such as a flag, identifying the type of video as being a single-stream compatible video. Some videos may only be single-stream compatible (i.e., single-stream only or multi-stream incompatible). For each new single-stream video that is assigned to be decoded by hardware decoder 134A or 134B, the hardware decoder may be configured to decode each new single-stream video. For example, to configure hardware decoder 134A the state of the decoder may be cleared from a memory location (not shown) associated with the hardware decoder 134A. A decoder state may indicate the last frame the hardware decoder decoded so that the hardware decoder knows which frame to expect next. For example, the decoder state may indicate that frame 20 of video 1 has been decoded, and the decoder expects that the next frame to be frame 21 of video 1. In another example, configuring a decoder may include clearing the contents of the decoder queue associated with the hardware decoder.

In multi-stream mode, multiple videos may be combined into a single bitstream that may be input to hardware decoder 134A or 134B. The multiple videos may be effectively stitched together in a manner so that the multi-source bitstream appears to hardware decoder 134A or 134B as a single bitstream. A limited number of videos may be combined into a single multi-source bitstream. For example, five multi-stream compatible videos may be combined into a single multi-source bitstream. For the sake of illustration, a hardware decoder configured in multi-stream mode may decode a multi-source bitstream with a maximum of 5 multi-stream compatible videos. It should be appreciated that the maximum of 5 multi-stream compatible videos is for purposes of illustration, and not intended as a limitation to the present disclosure. When video assigning module 130 assigns a multi-source bitstream to a hardware decoder, the hardware decoder outputs frames of the multi-source bitstream. The frames may be laid out on the output surface (not shown) of the hardware decoder. Application 132A or 132B may sample each frame from the output surface independently and simultaneously present five videos on the screen of user device 140A.

In some implementations, hardware decoder 134A or 134B may input a single bitstream, either a multi-source bitstream or a single-source bitstream at any given time, but not multiple bitstreams at one time. As discussed above, a multi-stream compatible video may contain or be associated with a video identifier, such as a flag, identifying the type of video as being a multi-stream compatible video. A multi-stream compatible video may also be single-stream compatible. For example, a multi-stream compatible video may be decoded by a hardware decoder in single-stream mode. In such a case, the multi-stream compatible video may not be combined with other videos. The multi-stream compatible video may be sent as a single bitstream to the input of a hardware decoder. The decoder may output a single video. In such a case, the multi-stream compatible video may effectively be considered as a single-stream compatible video for purposes of the present disclosure. It should be noted that all videos may be single-stream compatible. Every multi-stream compatible video may be single-stream compatible, but not every single-stream compatible video may be multi-stream compatible. Single-stream compatible videos that are only single-stream compatible may be refered to as single-stream only or multi-stream incompatible.

Hardware decoder 134A and 134B may be configured for multi-stream mode. Similar to the discussion above, configuring a hardware decoder for multi-stream mode may include clearing a decoder state from a memory location (not shown) and/or may include clearing the decoder queue of any contents.

Figure 2:
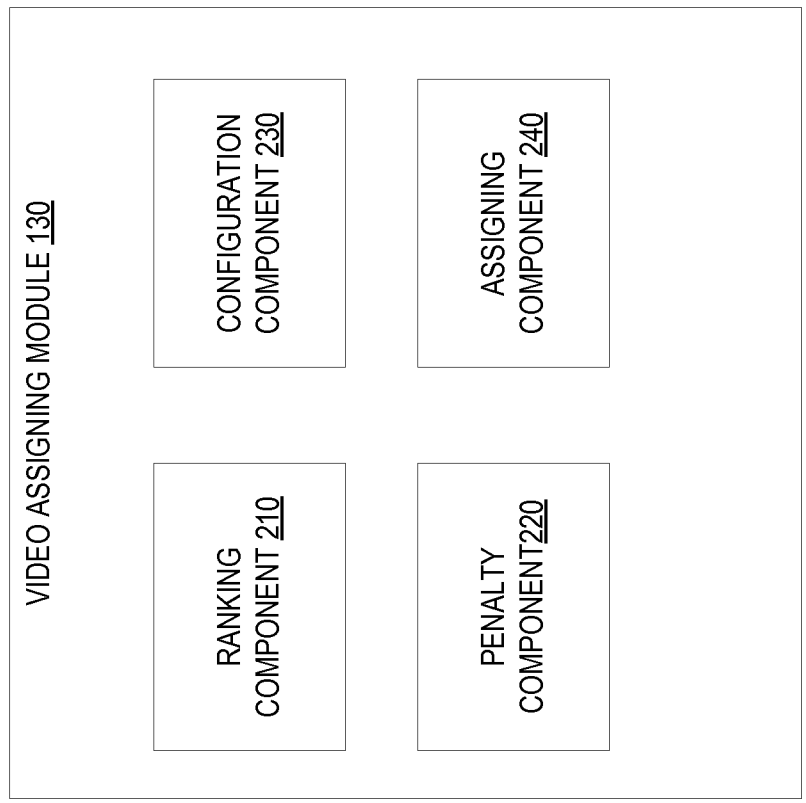
FIG. 2 is a block diagram illustrating a video assigning module, according to an implementation.

A hardware decoder may be subsequently re-configured (e.g., the hardware decoder can be switched from multi-stream mode to single-stream mode, and vice versa). When a hardware decoder switches modes and videos are added to the decoder queue, a penalty, such as a delay penalty may be incurred, as discussed above. When a hardware decoder is re-configured, the decoder queue may be cleared. Videos placed at the re-configured hardware decoder may be placed at the back of the decoder queue. The videos placed in the back of the decoder queue may be either new or moved videos since the decoder queue was previously cleared as part of the configuration. As a result of being placed at the back of the decoder queue, the decoding of the new or moved videos may be delayed by some time period. For example, the decoding of the new or moved videos may be delayed by one-third of a second. During the delay period, the respective videos appear blank on the screen of the user device 140A or 140B. During the delay period, the respective videos may be presented in a variety of ways such as appear black, appear as a low resolution thumbnail image, or appear as a frozen frame of a previously decoded frame from the respective video. The video assigning module 130 assigns videos to the decoders 134A and 134B in such a manner as to minimize the movement of videos between the decoders and to minimize the delay penalty for videos, thereby improving the user viewing experience. As will be discussed in more detail below, the video assigning module 130 can rank videos based on the viewer current interest, and assign the videos to the decoders using the rankings to ensure that at least the highest-ranked videos are decoded with no delay (or minimal delay). FIG. 2 is a block diagram illustrating a video assigning module, according to an implementation. Video assigning module 130 may include ranking component 210, penalty component 220, configuration component 230, and assigning component 240. Video assigning module 130 may include more or less components than those mentioned above.

Figure 3:
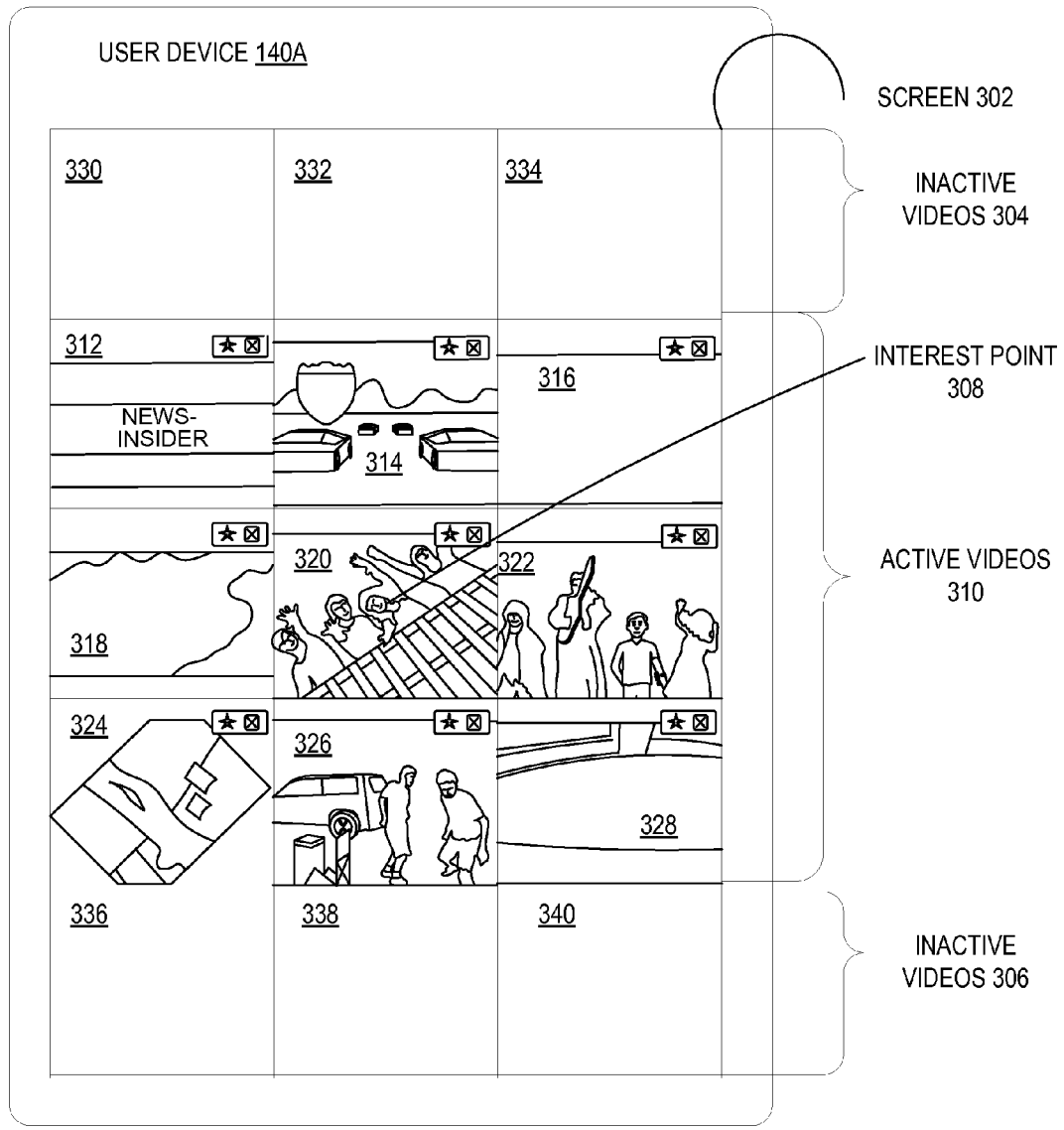
FIG. 3 illustrates an example user interface that simultaneously presents multiple videos, according to one implementation.

In one implementation, ranking component 210 may determine a ranking for each of a plurality of videos. In one example, the plurality of videos includes all or part of the videos downloaded from video hosting service 102 to a user device, such as user device 140A. The plurality of videos may be stored or cached in memory 136A. In another example, the plurality of videos may be all or part of the videos that may be presented on the screen of a user device, such as user device 140A. FIG. 3 illustrates an example user interface presenting multiple videos simultaneously, in accordance with one or more implementations of the present disclosure. The user interface is provided on screen 302 of user device 140A and includes 15 containers, containers 312-340, each of which may contain a video presented to a user of user device 140A. Containers may be a bounded area of a screen in which a video may be presented. Each container may have a different assigned video. In the present example, 15 videos may be displayed in containers 312-340. In one example, each of the plurality of videos may be ranked in sequential order, for example 1 through 15.

Referring to FIG. 2, ranking component 210 ranks each of the plurality of videos by determining a location for each of the plurality of videos on the screen of the user device, comparing the determined location to a current interest point on the screen, and ranking each of the plurality of videos based on the comparison of the determined location to the current interest point. The location of each of the plurality of videos on the screen may be the container location. A current interest point may be another location on the display that the user is presently likely to focus on, for example the center of screen 302. The distance from the location of each of the plurality of videos to the current interest point may be compared. Ranking component 210 may rank videos in order of increasing distance from the current interest point. For example, as shown in FIG. 3, the location for each of the plurality of videos on screen 302 of user device 140A may be the container boundary (e.g., outer rectangle) in which each of the plurality of videos may be presented. The current interest point is illustrated by interest point 308, which in the present illustration is the center of screen 302. Ranking component 210 may compare the distance of each container 312-340 to interest point 308. Videos located closer to the interest point 308 may be ranked higher than those further from the interest point 308. For example, video in container 320 may be ranked higher than any other video on screen 302. If more than one video is equidistance from the interest point, any number of tie-break procedures may be implemented. For example, any videos that are equidistance from the interest point may be ranked in descending order starting with videos (e.g., container containing a video) in the first geometrical quadrant (respective of the user's orientation of user device 140A) and moving counter clockwise through each successive quadrant until all the videos equidistance from the interest point are ranked. In such an example, rankings from 1 to 15 can be assigned to the videos in descending order as follows: video in container 320, video in container 314, video in container 322, video in container 326, video in container 318, video in container 316, video in container 328, video in container 324, video in container 312, video in container 332, video in container 338, video in container 334, video in container 340, video in container 336, and video in container 330.

In some implementations, ranking component 220 may determine the current interest point based on a predetermined position on the screen (e.g., the center of the screen) or a user action. The user action may be a user touch on the screen, a user positioning a cursor on the screen, or a user gaze on the screen. In FIG. 3, interest point 308 may be a predetermined position on screen 302. A user or developer may choose a position, such as the center of screen 302, as the current interest point. Alternatively, the predetermined position may be any location on screen 302. In another example, the current interest point may be based on a user action such as a user touching screen 302 at a particular location. A user may touch screen 302 with a touch object, such as a finger or stylus. The location of the touch on screen 302 may be used to determine the current interest point. In another example, a cursor position on the screen may be used to determine the current interest point. A user may move to, hover over, or click a location on the screen 302 which may be used to determine the current interest point. In another example, a gaze point of a user on the screen may be used to determine the current interest point. The gaze point of a user is the point on a screen of a user device at which a user is looking. Eye tracking technology which may incorporate one or more of near-infrared micro projectors, optical sensors, and image processors in a user device to determine the gaze point of a user.

In one implementation, configuration component 230 of video assigning module 130 may identify a type of each video for at least part of the plurality of videos. A type may be single-stream compatible video. Another type may be a multi-stream compatible video. An identifier, such as a flag, may be associated with a video that identifies a video as one of a single-stream compatible video or multi-stream compatible video. The identifier may be in the metadata associated with each video. Configuration component 230 may identify a type of each video based on such an identifier.

Configuration component 230 may determine, based on rankings and types of the plurality of videos, a configuration of hardware decoders to decode a subset of the plurality of videos for simultaneous presentation on a screen of a user device. The configuration may define a mode of each of the plurality of decoders, such as single-stream mode or a multi-stream mode. For example, with two hardware decoders four different configurations may be possible (decoder 134A mode/decoder 134B mode): multi-stream/multi-stream, single-stream/single-stream, multi-stream/single-stream, and single-stream/multi-stream. Simultaneous presentation on the screen may be the presentation of more than one video on a screen of a user device at the same time. Videos may be simultaneously presented when they are decoded by a hardware decoder at approximately the same time. For example, if 5 multi-stream compatible videos and 1 single-stream compatible video are decoded by hardware decoder 134A and 134B respectively, 6 videos may be simultaneously presented on the screen 302 of user device 140A. In reference to FIG. 3, if hardware decoders 134A and 134B decode 6 videos, the 6 videos may be a subset of the 15 videos that may be presented on screen 302.

When determining a configuration of the decoders, the configuration component 230 considers the minimum and the maximum number of videos that may be decoded by a given set of hardware decoders at approximately the same time. For example, if user device 140A has two hardware decoders 134A and 134B, the minimum number of videos that hardware decoders 134A and 134B may decode at approximately the same time is 2 videos. For instance, hardware decoders 134A and 134B may both be configured in single-stream mode and each have a single-stream compatible video in their respective decoder queue. The maximum number of videos that hardware decoders 134A and 134B may decode at approximately the same time is 10 videos. For instance, hardware decoders may both be configured in multi-stream mode. Each respective decoder queue may have a multi-source bitstream with each bitstream containing 5 multi-stream compatible videos. When determining a configuration of the decoders, configuration component 230 may prioritize the decoding of the highest ranked videos, and configuration component 230 may also maximize the number of the highest ranked videos that may be decoded at the same time using the video type (e.g., may choose to decode multi-stream compatible videos in multi-stream mode rather than in single-stream mode, as discussed above).

In one embodiment, if configuration component 230 knows the rank and type of each of the plurality of videos, configuration component may determine a configuration of the plurality of hardware decoders by considering different configuration options and selecting a configuration option that allows for (a) presenting a higher priority video over one or more lower priority videos, (b) maximizing the number of videos that can presented at the same time, and/or (c) minimizing "down time" resulting from the delay in the decoding process (between the time a video is placed in a decoder queue and the time the decoder begins decoding the video). For example, if the videos ranked 1 through 10 are all multi-stream compatible, configuration component 230 may determine that hardware decoders 134A and 134B may be configured as multi-stream/multi-stream. If videos ranked 1 and 2 are both single-stream compatible videos, configuration component 230 may determine that hardware decoders 134A and 134B may be configured as single-stream/single-stream. If videos ranked 1 through 5 are multi-stream compatible, the video ranked 6 is single-stream compatible, and videos 7 through 10 are multi-stream compatible, configuration component 230 may determine that hardware decoders 134A and 134B may be configured as multi-stream/single-stream or single-stream/multi-stream. It should be noted that in the present example videos 7 through 10 are not considered in determining configuration because configuration component may prioritize higher ranking videos. When configuration component 230 makes a first ranking, and no previous ranking has occurred, and the determined configurations are multi-stream/single-stream or single-stream/multi-stream, configuration component may determine a single configuration by configuring the first decoder (e.g., hardware decoder 134A) to be compatible with the highest ranking video and configuring the second decoder (e.g., hardware decoder 134B) in another mode. In the present example, hardware decoder 134A may be configured in multi-stream mode to decode videos 1 through 5 and hardware decoder 134B may be configured in single-stream mode to decode video 6 (i.e., multi-stream/single-stream).

Assigning component 240 may assign the subset of videos to the plurality of hardware decoders for decoding according to the configuration. Video assignment may refer to placing of a video (e.g., bitstream) in a queue of a specific a hardware decoder. Continuing with the above example, assigning component 240 may assign multi-stream compatible videos 1-5 to hardware decoder 134A and single-stream compatible video 6 to hardware decoder 134B. Assigning component 240 may also convert multi-stream compatible videos 1 through 5 into a single multi-source bitstream.

In another example, if the video ranked 1st is multi-stream compatible, the videos ranked 2 through 3 are single-stream compatible, and videos ranked 4-10 are multi-stream compatible, configuration component 230 may determine that a multi-stream/single-stream configuration may be used. Assigning component 240 may then place multi-stream compatible video 1 and videos 4 through 7 in the decoder queue of hardware decoder 134A, and place single-stream compatible video 2 in the decoder queue of hardware decoder 134B.

In some implementations, based on user interactions with the UI presenting the videos, rankings of the videos to be presented to a user may change. For example, a user may interact with the UI by scrolling up or down on a webpage or document being displayed. When a user scrolls up or down, the position of videos presented on screen 302 may change and new videos may be displayed on screen 302. The videos that become visible on screen 302 may include videos previously ranked and videos not previously ranked. The videos that were previously ranked may have changed position. Some videos previously ranked may be off of screen 302 and may no longer be ranked. New videos may be presented on screen 302. When the position of videos changes, ranking component 210 may identify new rankings for the videos. Ranking component 210 may determine a new location for each video, and rank each video based on the comparison between the new locations and the current interest point. In identifying new rankings, ranking component 210 may re-rank videos previously ranked, remove rankings for videos previously ranked, and/or rank new videos that were not previously ranked.

When the new ranking for the plurality of videos is identified, configuration component 230 may modify the configuration of the hardware decoders based on the new rankings. Configuration component 230 may prioritize the decoding of the highest ranked videos identified in the new rankings and modify the configuration of the hardware decoders accordingly. In particular, configuration component 230 may determine the new configuration of the decoders similarly to that discussed above with respect to the initial configuration of the hardware decoders.

For example, in a previous ranking, videos numbered 1 through 10 may be ranked 1 through 10, respectively. Videos numbered 1 through 10 may all be multi-stream compatible. Configuration component 230 determined that the hardware decoders 134A and 134B were to be configured as multi-stream/multi-stream. Videos 1 through 5 were assigned to decoder 134A and videos numbered 6 through 10 were assigned to decoder 134B. A user may scroll down a webpage that includes a plurality of videos. Ranking component 210 may identify a new ranking for the plurality of videos. In the new ranking, videos numbered 6 through 10 may be re-ranked 1 through 5. Videos numbered 6 through 10 may be multi-stream compatible. Video numbered 11 may be ranked $6^{th}$ and may be single-stream compatible. Configuration component 230 may determine a different configuration to decode the newly ranked videos, in which hardware decoders 134A and 134B should be configured as multi-stream/single-stream or single-stream/multi-stream, respectively. In particular, in order to decode videos numbered 6 through 11, one hardware decoder should be configured in multi-stream mode to decode videos 6 through 10 ranked 1 through 5, and another hardware decoder should be configured in single-stream mode to decode video 11 ranked $6^{th}$.

In one implementation, when modifying the configuration of the plurality of hardware decoders, penalty component 220 of video assigning module 130 may estimate the penalties for the different configurations and video assignments. A penalty, such as a delay penalty, may be a time delay of decoding a video at a hardware decoder. The time delay may be caused by moving a video from one hardware decoder to another or adding a new video to a hardware decoder. Penalty component 220 may estimate penalties for the different configurations and video assignments by determining a number of moves for videos from a previous video assignment to a new video assignment. Each move may comprise a delay penalty.

Continuing with the above example, initially hardware decoders 134A and 134B were configured as multi-stream/multi-stream. Videos 1 through 5 may have been assigned to decoder 134A and videos numbered 6 through 10 may have been assigned to decoder 134B. When a user scrolls down a webpage, ranking component 210 may identify new rankings for the videos. For example, videos numbered 6 through 10 may now be ranked 1 through 5. Videos numbered 6 through 10 may be multi-stream compatible. Video numbered 11 may be ranked $6^{th}$ and may be single-stream compatible. Configuration component 230 may determine that two different configurations may be able to decode the new ranked videos. The configuration of hardware decoders 134A and 134B may be multi-stream/single-stream or single-stream/multi-stream, respectively. Penalty component 220 may determine the number of moves of the ranked videos from a previous video assignment to a new video assignment for each configuration. In the configuration where hardware decoder 134A/134B is multi-stream/single-stream, videos numbered 6 through 10 should be assigned to hardware decoder 134A (e.g., multi-stream mode) and video number 11 should be assigned to hardware decoder 134B (e.g., single stream mode). Since videos numbered 6 through 10 were previously assigned (e.g., previous video assignment) to hardware decoder 134B, they should be moved to hardware decoder 134A according to the new configuration. Moving videos numbered 6 through 10 would incur 6 penalties, one for each video moved to a new assignment. For the sake of illustration, each move may be said to incur 1 penalty. It should be appreciated that each move may incur a different number of penalties (e.g., different delay times) depending on numerous factors specific to each implementation. Video numbered 11 should be assigned to hardware decoder 134B (e.g., single-stream mode). Even though adding a new video may incur a penalty, penalty component 220 may not need to estimate the penalty for a new video because assigning a new video would incur a penalty regardless of the configuration of hardware decoder 134A and 134B in single-stream/multi-stream or multi-stream/single-stream. For the configuration of multi-stream (134A)/single-stream (134B), the estimated penalty for video assignments may be 6 penalties. In the configuration where hardware decoder 134A/134B is single-stream/multi-stream, videos numbered 6 through 10 may be assigned to hardware decoder 134B (e.g., multi-stream mode) and video number 11 may be assigned to hardware decoder 134A (e.g., single stream mode). Since videos numbered 6 through 10 were previously assigned to hardware decoder 134B, no videos need to be moved from a previous decoder to a new decoder. Penalty component may estimate 0 penalties for the configuration of single-stream (134A)/multi-stream (134B).

Video assigning module 130 may select the configuration with the least penalty. In the above example, video assigning module 130 may select the configuration of single-stream (134A)/multi-stream (134B) because the configuration has the least amount of penalties (e.g., 0 penalties). Assigning component 240 may the assign videos numbered 6 through 11 to the hardware decoders 134A and 134B according to the new configuration (e.g., single-stream (134A)/multi-stream (134B)).

Referring again to FIG. 3, based on the decoder configuration determined as discussed above, containers 330, 332, 334, 336, 338, and 334 may have inactive videos, and containers 312, 314, 316, 318, 320, 322, 324, 326, and 328 may have active videos. Inactive videos may be videos associated with the containers but that have not been decoded by hardware decoders 134A and 134B. Active videos 310 may be videos simultaneously presented on the screen 302 of user device 140A. As discussed above, videos located near interest point 308 may be ranked higher than videos further from interest point 308. As a user scrolls down the content, videos at the top of the screen 302 may be become invisible and new videos that were not previously on screen 302 become visible. In response, video assigning module 130 may re-configure the hardware decoders and adjust the assignment of videos to the hardware decoders, which may change what containers include inactive videos and what containers include active videos.

Figure 4:
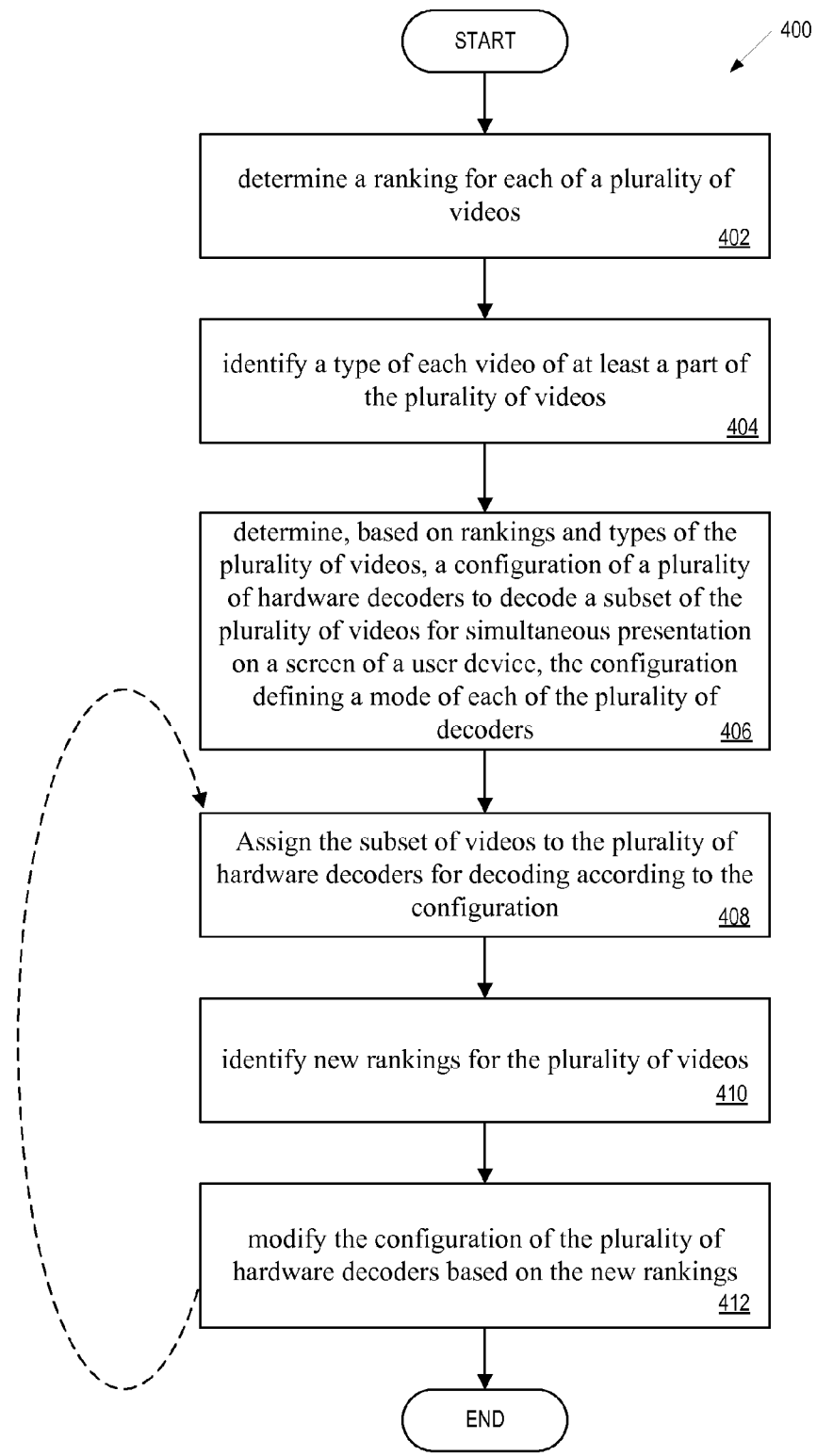
FIG. 4 is a flow diagram illustrating a method for assigning videos to single-stream and multi-stream decoders, according to some implementations of the disclosure.

FIG. 4 is a flow diagram illustrating a method for assigning videos to single-stream and multi-stream decoders, according to some implementations of the disclosure. Method 400 may be performed by processing logic that may comprise hardware (e.g., circuitry, dedicated logic, programmable logic, microcode, etc.), software (such as instructions run on a processing device), firmware, or a combination thereof. In one implementation, method 400 may be performed by computer system 100 of FIG. 1 (e.g., video assigning module 130). For simplicity of explanation, method 400 is depicted and described as a series of acts. However, acts in accordance with this disclosure can occur in various orders, concurrently, and/or with other acts not presented or described herein. Furthermore, not all illustrated acts may be required to implement method 400 in accordance with the disclosed subject matter. In addition, those skilled in the art will understand and appreciate that method 400 may alternatively be represented as a series of interrelated states via a state diagram or interrelated events.

Method 400 begins at block 402 where the processing logic determines a ranking for each of a plurality of videos. In one example, processing logic may determine rankings for all or part of the videos that may be presented on the screen 302 of user device 104A. Additional details of block 402 may be described in regards to FIGS. 1, 2, and 5.

At block 404, processing logic identifies a type of each video of at least a part of the plurality of videos. The type of video may single-stream compatible or multi-stream compatible. An identifier may be associated with each video identifying a video to be single-stream compatible or multi-stream compatible. Additional details of block 404 may be described in regards to FIGS. 1, 2, and 3.

At block 406, processing logic may determine, based on rankings and types of the plurality of videos, a configuration of a plurality of hardware decoders to decode a subset of the plurality of videos for simultaneous presentation on a screen of a user device, the configuration defining a mode of each of the plurality of decoders. For example, processing logic may prioritize decoding higher ranked videos. Processing logic may determine a configuration of hardware decoders capable of decoding the subset of videos in view of rankings and type. Additional details of block 406 may be described in regards to FIGS. 1, 2, and 3.

At block 408, processing logic may assign the subset of videos to the plurality of hardware decoders for decoding according to the configuration. Processing logic may assign the subset of videos to one of the decoder queues associated with each hardware decoder. Additional details of block 408 may be described in regards to FIGS. 1, 2, and 3.

At block 410, processing logic identifies new rankings for the plurality of videos. For example, when a user scroll down a document containing videos, the position of videos may change and new videos may be presented on screen 302. In response, processing logic may identify new rankings. Additional details of block 410 may be described in regards to FIGS. 1, 2, and 3.

At block 412, processing logic may modify the configuration of the plurality of hardware decoders based on the new rankings. After modifying the configuration, processing logic may return to block 408 to assign the videos to the modified configuration. Additional details of block 412 may be described in regards to FIGS. 1, 2, and 3.

Figure 5:
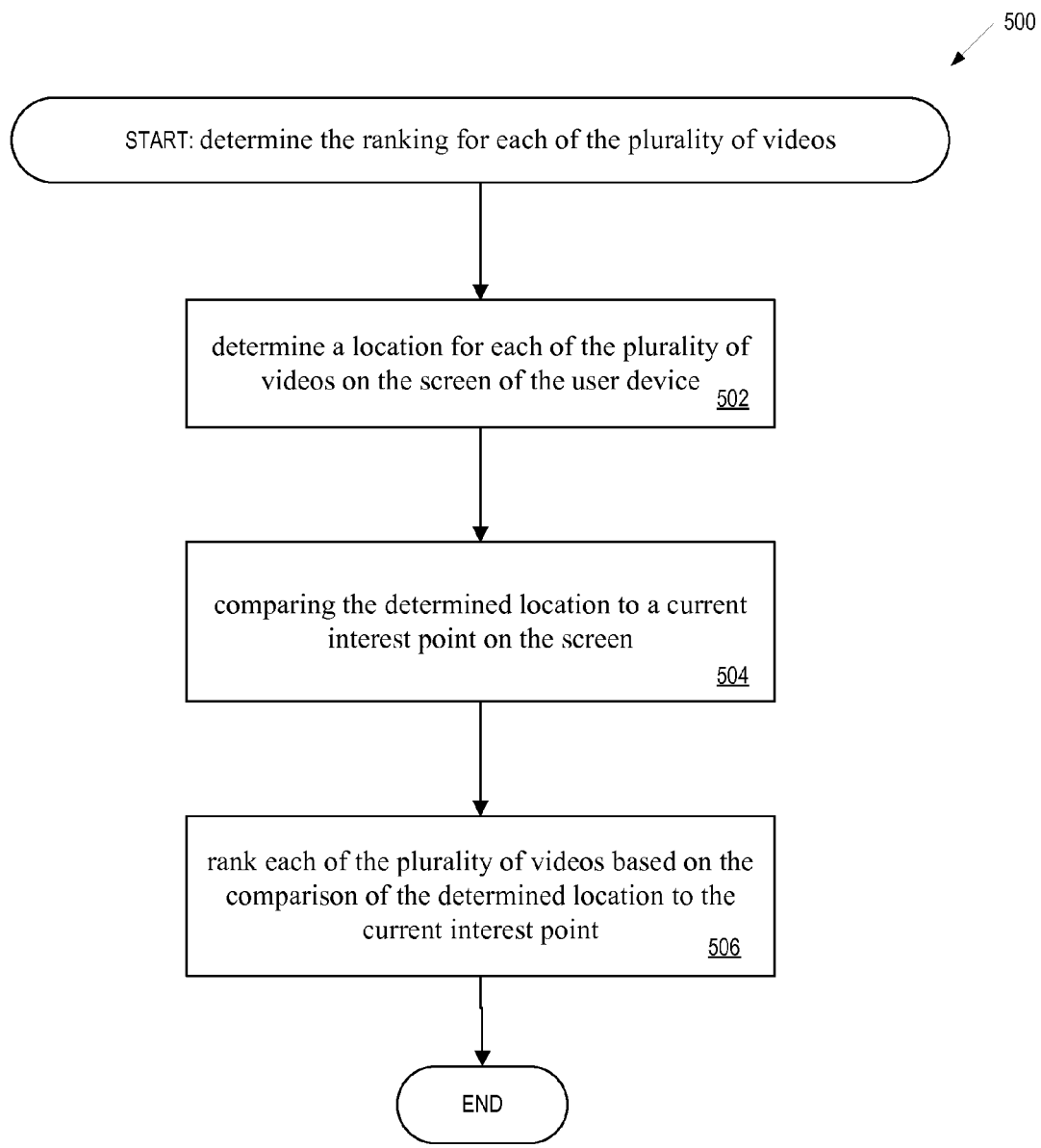
FIG. 5 is a flow diagram illustrating a method for determining a ranking for videos, according to some implementations of the disclosure.

FIG. 5 is a flow diagram illustrating a method for determining a ranking for videos, according to some implementations of the disclosure. Method 500 may be performed by processing logic that may comprise hardware (e.g., circuitry, dedicated logic, programmable logic, microcode, etc.), software (such as instructions run on a processing device), firmware, or a combination thereof. In one implementation, method 500 may be performed by computer system 100 of FIG. 1 (e.g., video assigning module 130). For simplicity of explanation, method 500 is depicted and described as a series of acts. However, acts in accordance with this disclosure can occur in various orders, concurrently, and/or with other acts not presented or described herein. Furthermore, not all illustrated acts may be required to implement method 500 in accordance with the disclosed subject matter. In addition, those skilled in the art will understand and appreciate that method 500 may alternatively be represented as a series of interrelated states via a state diagram or interrelated events.

Method 500 begins at block 502 where the processing logic determines a location for each of the plurality of videos on the screen of the user device. As illustrated in FIG. 3, screen 302 may include containers 312-340. Each container may be associated with a video. Each container 312-340 may be a location for one of the plurality of videos on the screen 302 of user device 140A. Additional details of block 502 may be described in regards to FIGS. 1, 2, and 3.

At block 504, processing logic may compare the determined location to the current interest point on the screen. For example, in FIG. 3 interest point 308 may be the current interest point on screen 302. The location of each of containers 312-340 may be compared to interest point 308 by comparing the distance from each container to interest point 308. Additional details of block 504 may be described in regards to FIGS. 1, 2, and 3.

At block 506, processing logic may rank each of the videos based on the comparison of the determined location to the current interest point. For example, in FIG. 3 containers closest interest point 308 are ranked higher than container further from interest point 308. Additional details of block 506 may be described in regards to FIGS. 1, 2, and 3.

Figure 6:
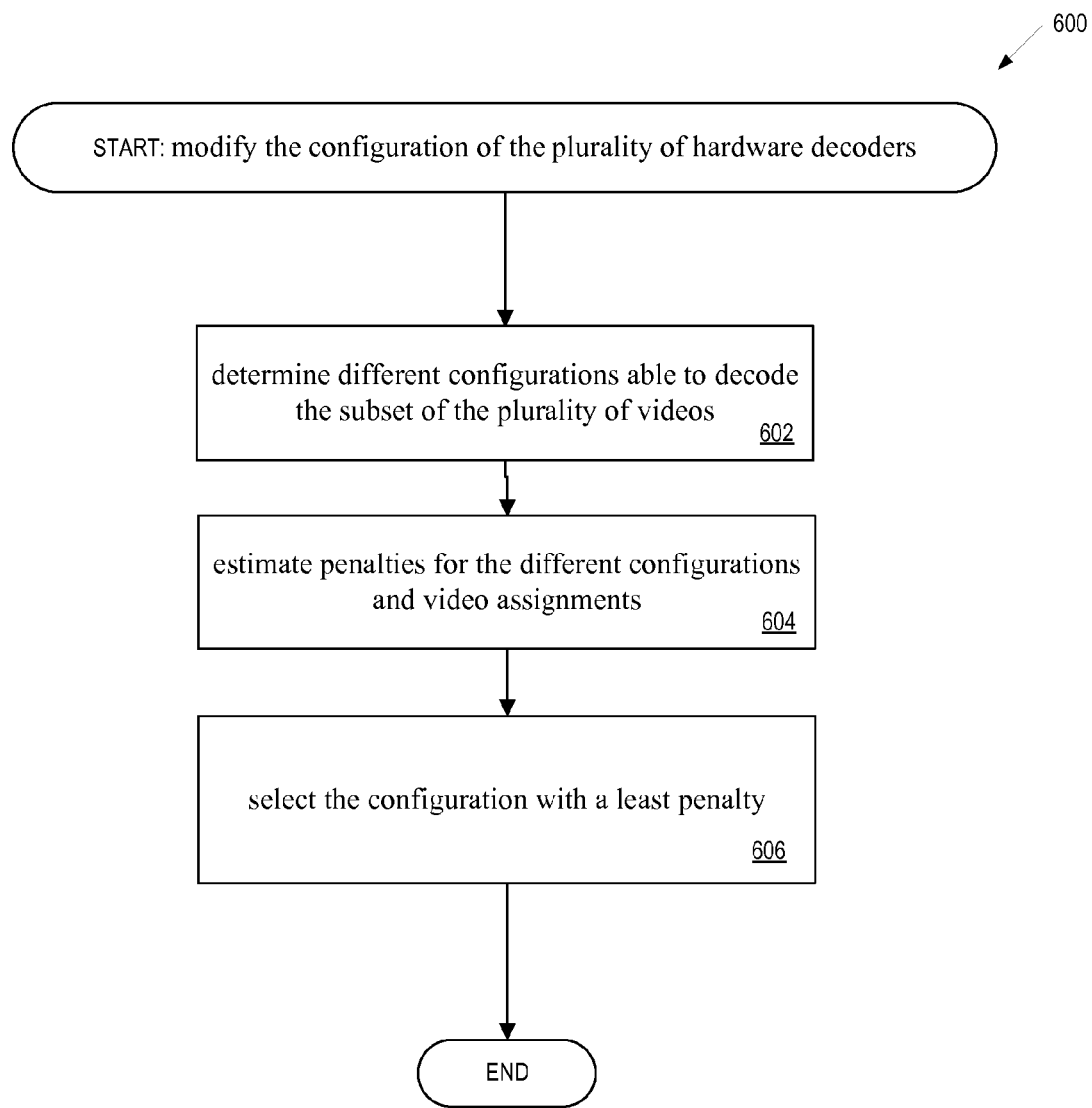
FIG. 6 is a flow diagram illustrating a method for modifying a configuration of hardware decoders, according to some implementations of the disclosure.

FIG. 6 is a flow diagram illustrating a method for modifying a configuration of hardware decoders, according to some implementations of the disclosure. Method 600 may be performed by processing logic that may comprise hardware (e.g., circuitry, dedicated logic, programmable logic, microcode, etc.), software (such as instructions run on a processing device), firmware, or a combination thereof. In one implementation, method 600 may be performed by computer system 100 of FIG. 1 (e.g., video assigning module 130). For simplicity of explanation, method 600 is depicted and described as a series of acts. However, acts in accordance with this disclosure can occur in various orders, concurrently, and/or with other acts not presented or described herein. Furthermore, not all illustrated acts may be required to implement method 600 in accordance with the disclosed subject matter. In addition, those skilled in the art will understand and appreciate that method 600 may alternatively be represented as a series of interrelated states via a state diagram or interrelated events.

Method 600 begins at block 602 where the processing logic determines different configurations able to decode the subset of the plurality of videos. The different configurations able to decode the subset of the plurality of videos may include a first number of hardware decoders in a first mode required to decode at least a part of the subset of the plurality of videos and a second number of hardware decoders in a second mode required to decode at least another part of the subset of the plurality of videos.

At block 604, processing logic estimates penalties for the different configurations. Estimating penalties for the different configurations and video assignments may involve determining, for each of the different configurations, a number of moves for videos from the subset of the plurality of videos from a previous video assignment to a new video assignment, where each move corresponds to a delay penalty.

At block 606, processing logic selects the configuration with the least penalty. Additional details of blocks 602, 604, and 606 may be described in regards to FIGS. 1, 2, and 3.

Figure 7:
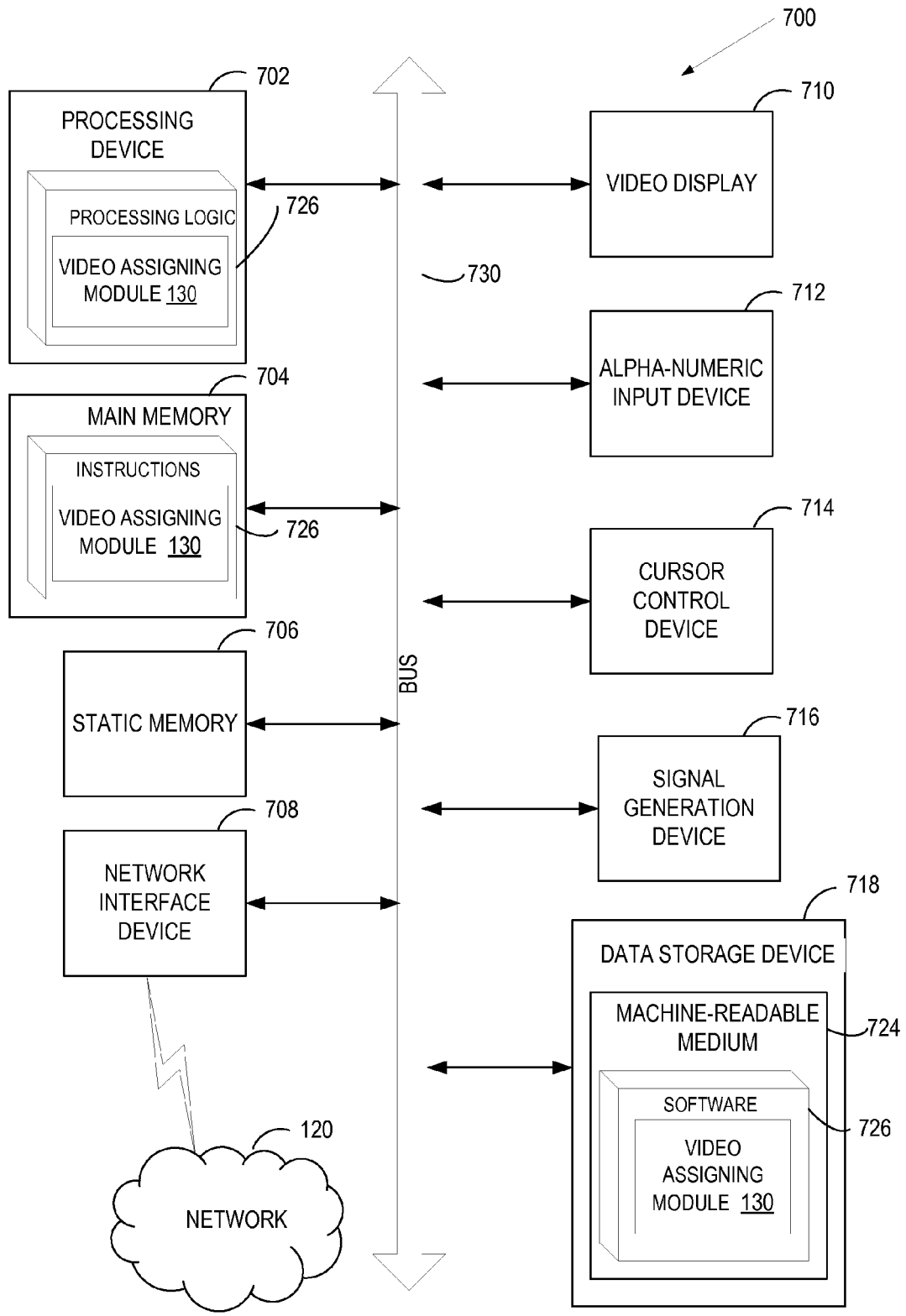
FIG. 7 is a block diagram illustrating an exemplary computer system, according to some implementations.

FIG. 7 is a block diagram illustrating an exemplary computer system, according to some implementations. In alternative implementations, the machine may be connected (e.g., networked) to other machines in a LAN, an intranet, an extranet, or the Internet. The machine may operate in the capacity of a server or a user device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 700 includes a processing device 702, a main memory 704 (e.g., read-only memory (ROM), flash memory, dynamic random access memory (DRAM) (such as synchronous DRAM (SDRAM) or DRAM (RDRAM), etc.), a static memory 706 (e.g., flash memory, static random access memory (SRAM), etc.), and a data storage device 718, which communicate with each other via a bus 730.

Processing device 702 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 may be configured to execute the processing logic 726 for performing the operations and steps discussed herein.

The computer system 700 may further include a network interface device 708 communicably coupled to a network 720. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 716 (e.g., a speaker).

The data storage device 718 may include a machine-accessible storage medium 724 on which may be stored software 726 embodying any one or more of the methodologies of functions described herein. The software 726 may also reside, completely or at least partially, within the main memory 704 as instructions 726 and/or within the processing device 702 as processing logic 726 during execution thereof by the computer system 700; the main memory 704 and the processing device 702 also constituting machine-accessible storage media.

The machine-readable storage medium 724 may also be used to store instructions 726 to implement the video assigning module 130 to implement any one or more of the methodologies of functions described herein in a computer system, such as the computer system described with respect to FIG. 1, and/or a software library containing methods that call the above applications.

While the machine-accessible storage medium 724 is shown in an example implementation to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that may be capable of storing, encoding or carrying a set of instruction for execution by the machine and that cause the machine to perform any one or more of the methodologies of the disclosure. The term "machine-accessible storage medium" shall accordingly be taken to include, but not be limited to, solid-state memories, and optical and magnetic media.

In the foregoing description, numerous details are set forth. It may be apparent, however, that the disclosure may be practiced without these specific details. In some instances, well-known structures and devices are shown in block diagram form, rather than in detail, in order to avoid obscuring the disclosure.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying", "scheduling", "estimating", "selecting", "determining", "ranking", "assigning", "modifying", "comparing", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the required purposes, or it may comprise a general purpose computer selectively activated or reconfigured by a computer program stored in the computer. Such a computer program may be stored in a machine readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems may appear as set forth in the description below. In addition, the disclosure is not described with reference to any particular programming language. It may be appreciated that a variety of programming languages may be used to implement the teachings of the disclosure as described herein.

The disclosure may be provided as a computer program product, or software, that may include a machine-readable medium having stored thereon instructions, which may be used to program a computer system (or other electronic devices) to perform a process according to the disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), etc.

Whereas many alterations and modifications of the disclosure may no doubt become apparent to a person of ordinary skill in the art after having read the foregoing description, it is to be understood that any particular example shown and described by way of illustration is in no way intended to be considered limiting. Therefore, references to details of various examples are not intended to limit the scope of the claims, which in themselves recite only those features regarded as the disclosure.

What is claimed is:

1. A method comprising:
   determining, by a processing device, a ranking for each of a first plurality of videos;
   identifying a type of each video for at least a part of the first videos;
   determining, based on rankings and types of the first videos, a first plurality of configurations of a plurality of hardware decoders to decode a subset of the first videos for simultaneous presentation on a screen of a user device, the configuration defining a mode of each of the hardware decoders;
   estimating penalties for the first configurations of the hardware decoders;
   selecting a configuration of the first configurations of the hardware decoders based on the estimated penalties; and
   assigning, by the processing device, the subset of the first videos to the hardware decoders for decoding according to the configuration.

2. The method of claim 1, further comprising:
   identifying rankings for a second plurality of videos; and
   modifying the configuration of the hardware decoders based on the rankings for the second videos.

3. The method of claim 2, wherein modifying the configuration of the hardware decoders comprises:
   determining a second plurality of configurations of the hardware decoders to decode a subset of the second videos;
   estimating penalties for the second configurations of the hardware decoders; and
   selecting the configuration with a least penalty to decode the subset of the second videos.

4. The method of claim 3, wherein estimating the penalties for the second configurations of the hardware decoders comprises:
   for each configuration of the second configurations, determining a number of moves for videos from the subset of the second videos from a previous video assignment to a new video assignment, wherein each move comprises a delay penalty.

5. The method of claim 3, wherein the second configurations of the hardware decoders to decode the subset of the second videos comprise a first number of the hardware decoders in a first mode to decode at least a part of the subset of the second videos and a second number of the hardware decoders in a second mode to decode at least another part of the subset of the second videos.

6. The method of claim 1, wherein determining the ranking for each of the first videos, comprises:
   determining a location for each of the first videos for presentation on the screen of the user device;
   comparing the determined location to a current interest point on the screen; and
   ranking each of the first videos based on the comparison of the determined location to the current interest point.

7. The method of claim 6, wherein the current interest point is determined based on one of a predetermined positon on the screen or a user activity, the user activity comprising one of a user touch on the screen, a cursor positioning on the screen, or a user gaze on the screen.

8. The method of claim 1, wherein the user device is a mobile device.

9. The method of claim 1, wherein the mode of each of the hardware decoders is one of a single-stream mode or a multi-stream mode.

10. The method of claim 1, wherein the subset of the first videos is simultaneously presented at a frame rate that provides a visually imperceptible pause between successive visually distinct frames.

11. The method of claim 1, wherein the first videos are video previews.

12. A system comprising:
   a memory to store instructions for a video assigning module;
   a processing device, coupled with the memory, to execute the instructions; and
   the video assigning module, executed by the processing device, to:
      determine a ranking for each of a first plurality of videos;
      identify a type of each video for at least a part of the first videos;
      determine, based on rankings and types of the first videos, a configuration of a first plurality of configurations of a plurality of hardware decoders to decode a subset of the first videos for simultaneous presentation on a screen of a user device, the configuration defining a mode of each of the hardware decoders;

estimating penalties for the first configuration of the hardware decoders;

selecting a configuration of the first configurations of the hardware decoders based on the estimated penalties; and assign, by the processing device, the subset of the first videos to the hardware decoders for decoding according to the configuration.

13. The system of claim 12, wherein the video assigning module, executed by the processing device, further to:

identify rankings for a second plurality of videos; and modify the configuration of the hardware decoders based on the rankings for the second videos.

14. The system of claim 13, wherein to modify the configuration of the hardware decoders, the video assigning module, executed by the processing device, to:

determine a second plurality of configurations of the hardware decoders to decode a subset of the second videos;

estimate penalties for the second configurations of the hardware decoders; and select the configuration with a least penalty to decode the subset of the second videos.

15. The system of claim 12, wherein to determine the ranking for each of the first videos, the video assigning module, executed by the processing device, to:

determine a location for each of the first videos for presentation on the screen of the user device;

compare the determined location to a current interest point on the screen; and rank each of the first videos based on the comparison of the determined location to the current interest point.

16. The system of claim 12, wherein the mode of each of the hardware decoders is one of a single-stream mode or a multi-stream mode.

17. A non-transitory computer readable storage medium including instructions that, when executed by a processing device, cause the processing device to perform a process comprising:

determining, by the processing device, a ranking for each of a first plurality of videos;

identifying a type of each video for at least a part of the first videos;

determining, based on rankings and types of the first videos, a first plurality of configurations of a plurality of hardware decoders to decode a subset of the first videos for simultaneous presentation on a screen of a user device, the configuration defining a mode of each of the hardware decoders;

estimate penalties for the first configurations of the hardware decoders;

select a configuration of the first configurations of the hardware decoders based on the estimated penalties; and assigning, by the processing device, the subset of the first videos to the hardware decoders for decoding according to the configuration.

18. The non-transitory computer readable storage medium of claim 17, the process further comprising:

identifying rankings for a second plurality of videos; and modifying the configuration of the hardware decoders based on the rankings for the second videos.

19. The non-transitory computer readable storage medium of claim 18, wherein modifying the configuration of the hardware decoders, the process comprises:

determining a second plurality of configurations of the hardware decoders to decode a subset of the second videos;

estimating penalties for the second configurations of the hardware decoders; and selecting the configuration with a least penalty to decode the subset of the second videos.

20. The non-transitory computer readable storage medium of claim 17, wherein determining the ranking for each of the first videos, the process comprises:

determining a location for each of the first videos for presentation on the screen of the user device;

comparing the determined location to a current interest point on the screen; and ranking each of the first videos based on the comparison of the determined location to the current interest point.

* * * * *